United States Patent [19]

Lie

[11] Patent Number: 5,244,014
[45] Date of Patent: * Sep. 14, 1993

[54] MULTI-WAY VALVE

[75] Inventor: Amund Lie, Otta, Norway

[73] Assignee: Henry Ehrenberg, Fed. Rep. of Germany

[*] Notice: The portion of the term of this patent subsequent to Apr. 21, 2009 has been disclaimed.

[21] Appl. No.: 829,732

[22] Filed: Feb. 24, 1992

Related U.S. Application Data

[62] Division of Ser. No. 527,573, May 23, 1990, Pat. No. 5,105,853.

Foreign Application Priority Data

May 23, 1989 [NO] Norway .................. 892053

[51] Int. Cl.$^5$ ............................................. F16K 11/02
[52] U.S. Cl. ................................. 137/625.46; 137/875; 251/298
[58] Field of Search .............. 137/625.45, 625.46, 137/875; 251/298

[56] References Cited

U.S. PATENT DOCUMENTS

| | | | |
|---|---|---|---|
| 3,095,177 | 6/1963 | Muller . | |
| 3,270,775 | 9/1966 | Alderson | 137/875 X |
| 3,373,771 | 3/1968 | Boyen | 137/875 X |
| 3,837,411 | 9/1974 | Nash et al. | 137/875 |
| 4,121,607 | 10/1978 | Bader | 251/298 X |
| 4,597,415 | 7/1986 | Gieske | 251/298 X |
| 4,697,786 | 10/1987 | Kennedy . | |
| 4,822,000 | 4/1989 | Bramblet | 251/298 |
| 5,105,853 | 4/1992 | Lie | 137/625.46 |

FOREIGN PATENT DOCUMENTS

| | | |
|---|---|---|
| 2704327 | 8/1978 | Fed. Rep. of Germany . |
| 3603998 | 8/1986 | Fed. Rep. of Germany . |
| 555497 | 10/1974 | Switzerland . |

Primary Examiner—Gerald A. Michalsky
Attorney, Agent, or Firm—Quarles & Brady

[57] ABSTRACT

A three-way valve (11) is formed from three identical casing parts (13), between which is inserted a one-piece sealing cage (15). The flap-like valve body has a closure face (31) displaced eccentrically with respect to the axis or spindle (20) and whose marginal areas cooperate with the webs (24) of the seal (15). The valve creates an almost unconstricted passage in all three deflection directions and has only narrow, clearly defined sealing areas and can be completely washed round in a cleaning position.

6 Claims, 4 Drawing Sheets

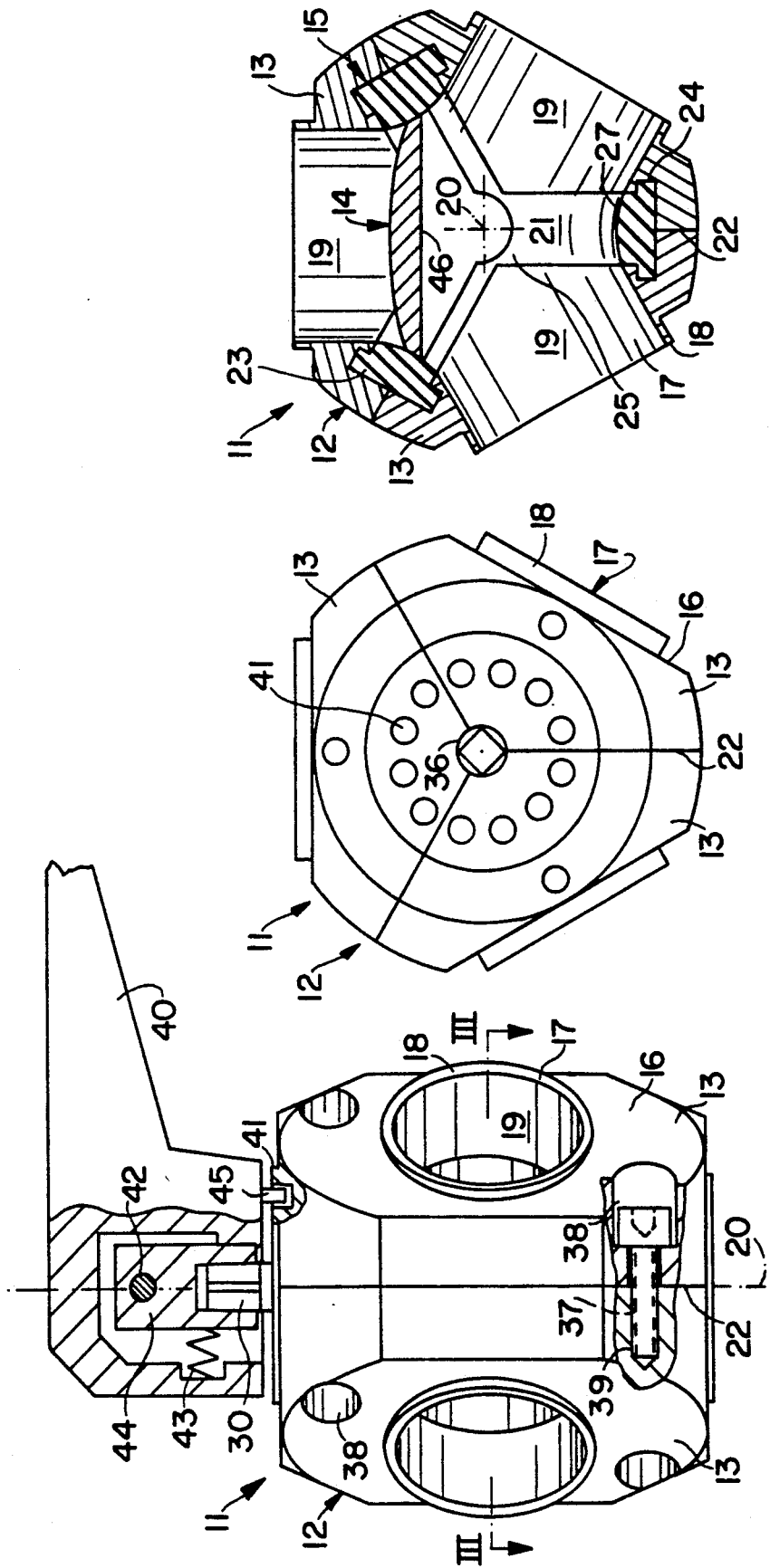

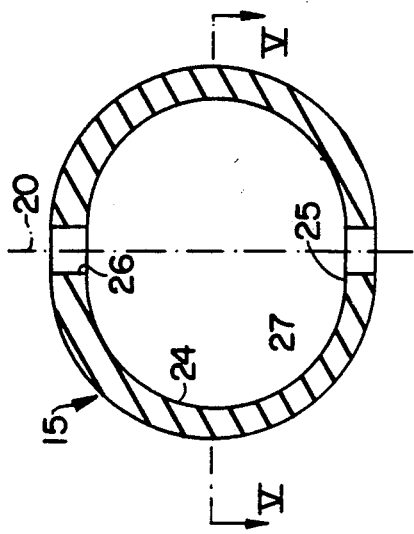
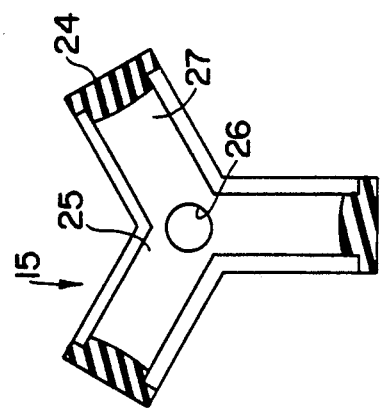
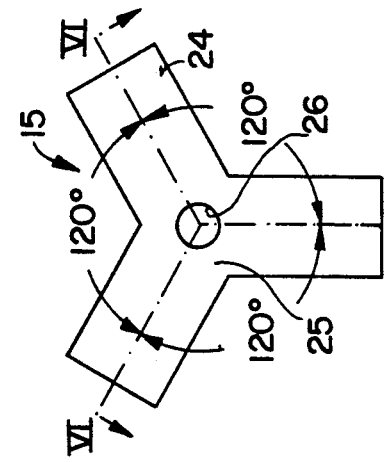
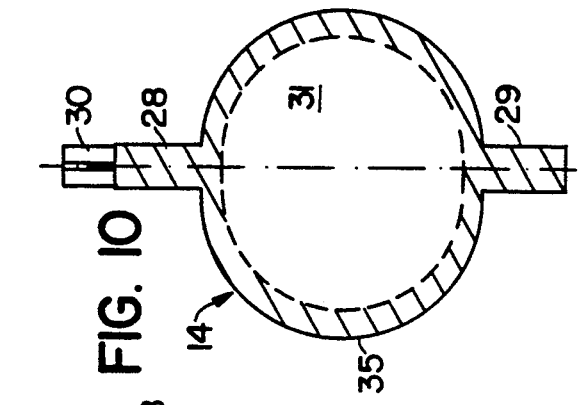
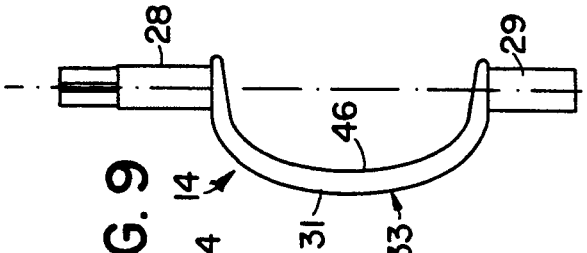
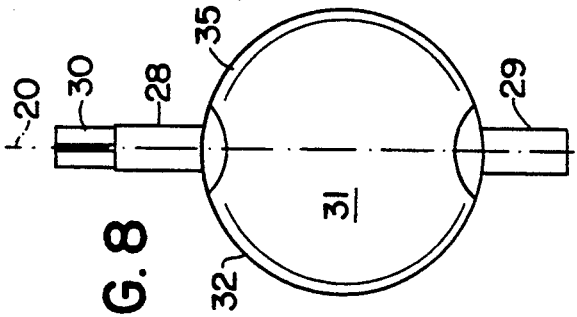
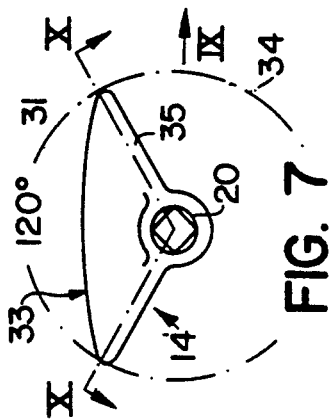

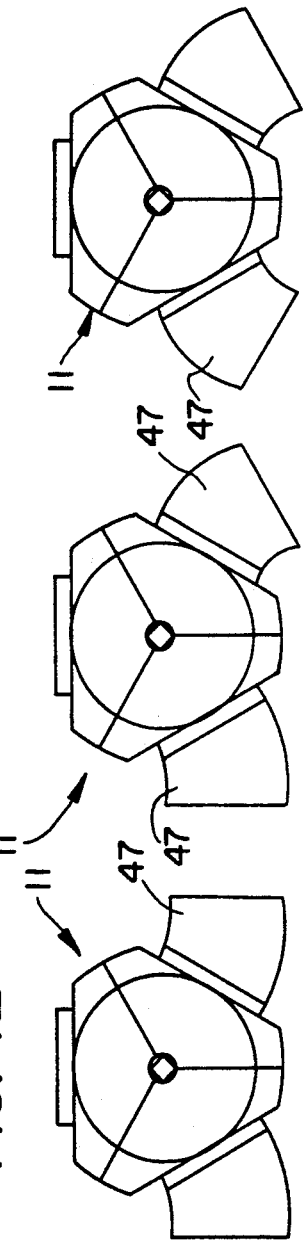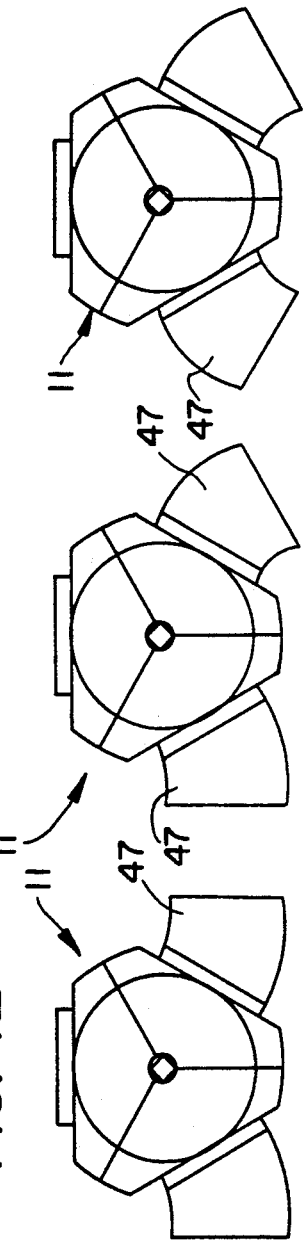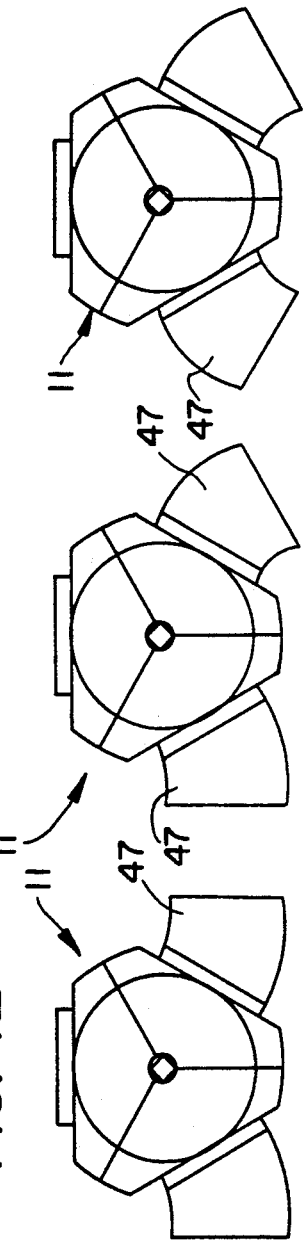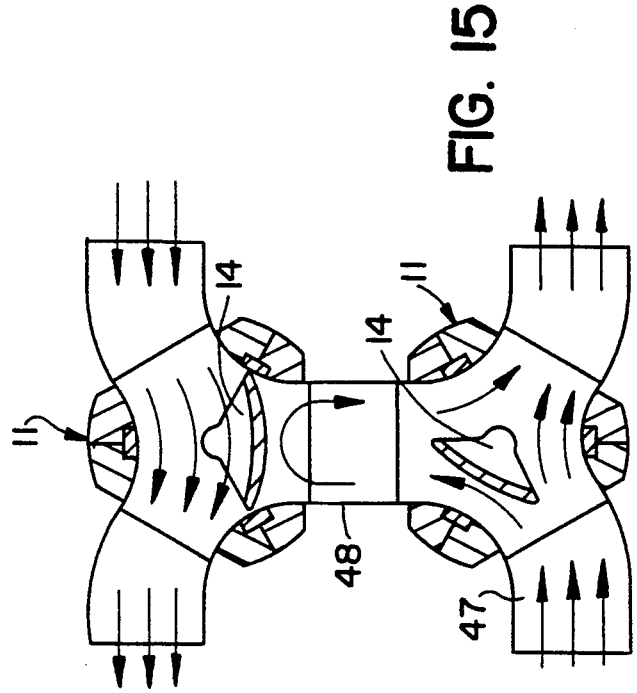

MULTI-WAY VALVE

This is a division of application Ser. No. 527,573, filed May 23, 1990, now U.S. Pat. No. 5,105,853.

BACKGROUND OF THE INVENTION

1. Field of the Invention

The invention relates to a valve, particularly a multiway valve.

2. Prior Art

U.S. Pat. No. 4,653,725 discloses a flap or leaf valve, whose symmetrical flap passes through the valve passage or port in transverse manner. The outer circumference of the flap cooperates with a seal surrounding the valve channel. These valves are particularly advantageous for the food industry, because they can easily be cleaned e.g. by washing. However, they can only be used as stop or throttle valves.

DE-A-3 612 672 discloses a multiway operating fitting, which has a pivotable flap in a cylindrical casing into which issue four connecting passages. The symmetrical flap can, as desired, connect each connecting passage to the passages adjacent thereto. However, this operating fitting is not usable in a general manner, because it does not have a clearly defined closed position.

SUMMARY OF THE INVENTION

An object of the invention is to provide a valve, which avoids the disadvantages of the prior art and in particular allows more universal use, manufacture at low cost and easy cleaning.

In the present invention, the advantages of the flap valve, its easy operation and cleaning are retained and the possible uses considerably extended. As a result of the flap arranged eccentrically with respect to the axis, it is possible to provide a multiway and in particular a three-way valve, which interconnects the connecting passages in a random manner by pivoting the valve body and which can serve as a stop valve for at least one passage. It is also possible to set a throttle position and preferably the valve body can be brought into a cleaning position in which the entire valve body, to the extent that it is located in the valve chamber, can be rinsed around from all sides. The valve body can be adjusted in such a way that the rinsing or washing liquid can also flow through a passage portion not located in the washing liquid flow.

The valve body is preferably constructed in such a way that it only cooperates with its outer marginal area on the valve body side remote from the flap axis with sealing means, which are located on the valve chamber circumference and need not restrict the same. This leads to a clearly defined sealing mating surface, while the remaining closure portion of the flap can be shaped in accordance with the particular requirements. Although the flap is preferably somewhat curved, it is flatter than would correspond to a rotating body about the axis, so that in the case of valve actuation, it runs free from the seal and does not have to sweep over the seal. Thus, no special precision and surface quality requirements are required with respect to this closure portion surface. As a result, it is also ensured that in an intermediate position, both the sealing faces of the seal and also the complete valve body are freely exposed for cleaning purposes.

The sealing medium or means is preferably constituted by a cohesive ring cage-like sealing body, which has the same number of webs as connecting passages which emanate from two central crossing points, through which the valve flap spindle passes in sealed manner. Variants are possible as a function of the particular requirements. For example, on one side the flap spindle need not pass through the seal and could optionally be mounted therein. It would also be possible to use separate sealing rings for each passage and the flap spindle, although the unitary sealing body has constructional and operational advantages. Seals on the valve body are also possible. However, the seal arrangement on the casing offers the advantage that it also reciprocally seals the casing parts.

It is particularly advantageous to construct the valve casing from identical parts, whose number corresponds to the number of connecting passages and whereof each contains such a passage. The seal can be positioned at the parting lines and can be fixed there by clamping so as to seal the same. Thus, a three-way valve can be manufactured from only five main parts, namely three casing segments, a valve body and a sealing element.

Although the construction as a multiway valve is preferred, the valve can also be used for other purposes, e.g. as a stop valve. In this case the eccentrically arranged valve body, with the valve in the open position, would be pivoted in front of a wall portion. This would retain the advantage achieved in all constructions that, in the open state, the valve body does not pass through the passage cross-section of the valve so as to constrict the same. This passage cross-section is completely free and scarcely needs any variation with regards to its cross-sectional shape. This ensures an extremely low flow resistance and advantages in cleaning and conveying heavy products, e.g. fibrous suspensions, etc., which tend to stick to the valve body.

BRIEF DESCRIPTION OF THE DRAWINGS

These and further features of the invention can be gathered from the claims, description and drawings. The individual features, both alone and in the form of subcombinations can be realized in an embodiment of the invention and in other fields and can represent advantageous, independently patentable constructions, for which protection is hereby claimed. The invention is described in greater detail hereinafter relative to an embodiment and the attached drawings, wherein:

FIG. 1 shows a side elevation view of a three-way valve of the present invention;

FIG. 2 shows a top plan view thereof;

FIG. 3 is a section along line III;

FIG. 4 is a top plan view of the sealing web of the present invention;

FIG. 5 is a section view along the line V—V in FIG. 6;

FIG. 6 is a section view along line VI—VI in FIG. 4;

FIG. 7 is a top plan view of a valve flap of the present invention;

FIG. 8 is a front elevation view of the valve flap;

FIG. 9 is a side elevation of the valve flap;

FIG. 10 is a partial sectional view through the valve flap of FIG. 7 along lines X—X;

FIG. 12 is a top plan view of the valve of the present invention showing a first arrangement of the connecting pieces;

FIG. 13 is a top plan view of the valve of the present invention showing a second configuration of the connecting pieces;

FIG. 14 is a top plan view of the present invention showing a third configuration of the connecting pieces; and FIG. 15 is a mounting example of two valves.

Figure 11:
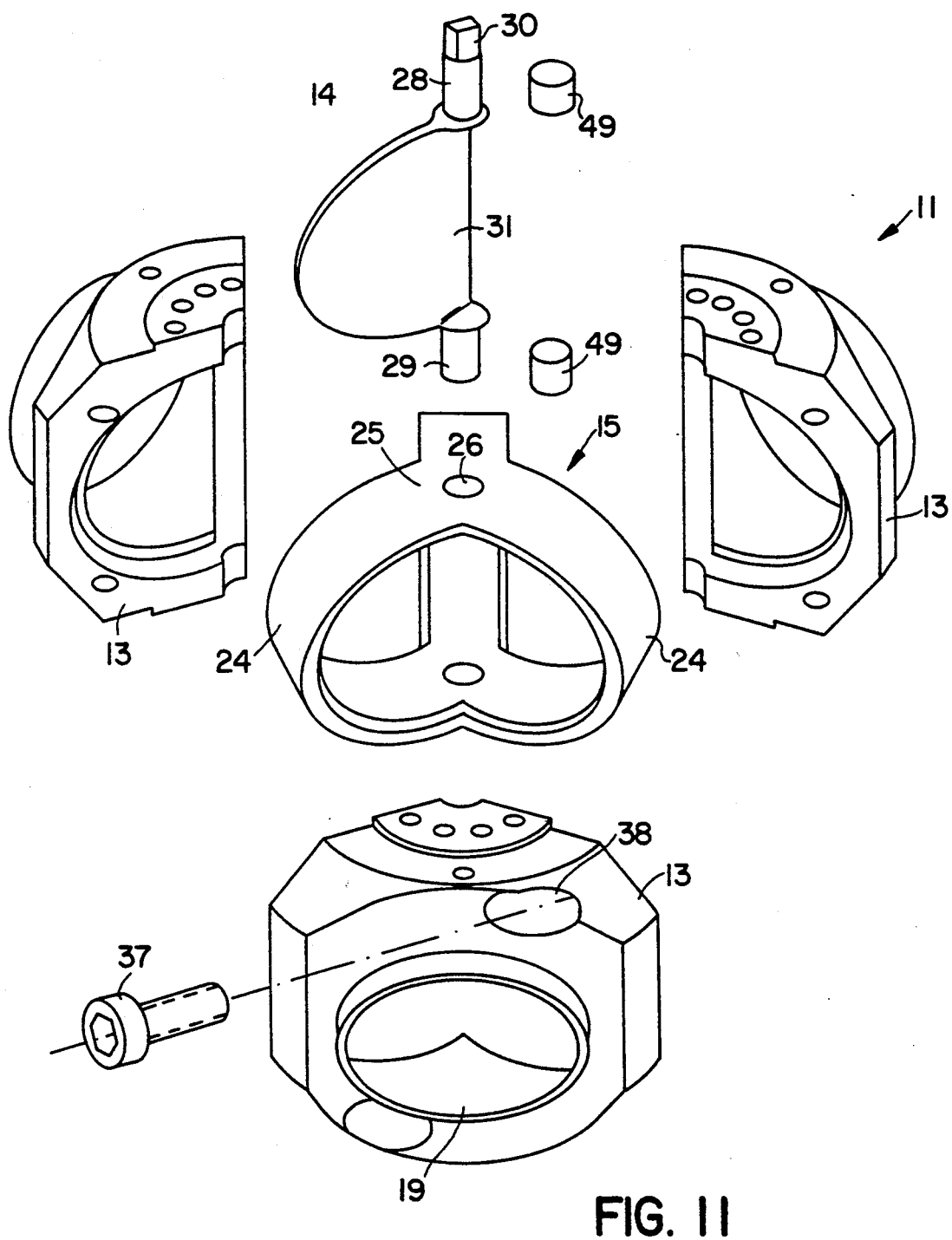
FIG. 11 is an exploded view of a three-way valve.

A three-way valve 11 comprises a valve casing 12, which is formed by three identical, segmental parts 13, a flap-like valve body 14 forming a closure means and a seal 15. The valve casing 12 is a polygonal, but fundamentally almost spherical block, which has three connections 17, which can e.g. have welding webs 18, on three flattened portions 16 reciprocally displaced in each case by 120°. The connecting passages 19 connected to each connection are circular, very short and run centrally with respect to the valve central axis 20, where they pass into one another in a common valve chamber 21. The three casing parts 13 of the valve body engage with one another along joint faces 22, in whose vicinity are provided undercut recesses 23, in which are fixed webs 24 of the seal 15 with a T-shaped cross-section.

The seal 15 is shaped like a cage formed from three webs 24 bent in a substantially semicircular or semielliptical manner and reciprocally displaced by 120°. The webs 24 meet in two crossing areas 25, where there are through holes 26. The insides 27 of the webs 24 are convexly curved and form a sealing face cooperating with the valve body 14.

The seal 15 comprising a unitary, one-piece shaped body made from rubber or an elastic plastics material (cf. particularly FIGS. 4 to 6) is so inserted in the vicinity of the joint faces 22 between the casing parts 13 (FIG. 3), that it is positively held in the recesses 23. The assembled casing parts 13 brought into contact with their joint faces 22 and the inner sealing faces 27 form connecting portions between the connecting passages 19, i.e. wall portions of the valve chamber 21. The seal simultaneously seals the casing parts, the valve body spindle and the valve body in the closed state.

The valve body 14 (FIGS. 7 to 10) comprises two journals 28, 29, whereof one carries at its end a terminating profiling (e.g. a square). Between the journals 28, 29 is located a closure portion 31, which is laterally displaced with respect to the axis or spindle 20 and which has a spoon-like curved shape, which can be more clearly seen in FIGS. 7 to 8. In the view according to FIG. 8 it is symmetrical and circular and is arcuately curved in a view at right angles thereto, but has a smaller radius of curvature than edge 32 in FIG. 8, so that the back surface 33 in its centre has a significant spacing from an imaginary body of revolution which would be described by line 32.

FIG. 7 shows that the back surface 33 is much flatter than the rotation circle 34 about the axis 20.

In the embodiment the valve body has a marginal area 35, which is located on an imaginary body of revolution about the axis 20 and in the case of a circular construction of the connecting passages on a spherical surface. In this area 35 the valve body cooperates with the sealing faces 27 of the valve body 15, whilst all the remaining parts of the closure portion 31 are free therefrom. Thus, only the hatched surfaces in FIG. 10 engage on the sealing body, namely the journals 28, 29, which are sealingly guided in the holes 26, and the marginal areas 35.

FIGS. 6 and 10 show sections of the seal and valve body guided along bent section lines. They show that the sealing webs 24 and the marginal areas 35 in reality have an elliptical shape, because the joint faces 22 intersect in sloping manner the circular connecting channels 19 and consequently form elliptical sectional surfaces. These conditions differ with the number of connecting channels and therefore the angles between the casing parts. In the same way the connecting channels centrally traversing each casing part in the embodiment can also be asymmetrically arranged or have a non-circular shape, if this is more favorable for the connecting conditions or the flow guidance.

The journals 28, 29 traverse the valve casing 12 in the correspondingly recessed center 36, where the casing parts 13 meet. The casing parts are held together by screws 37, which are inserted in screw holes 38 and which are in each case screwed into tapholes 39 of the adjacent part. The two screws 37 traversing a parting line 22 are provided above and below the plane of the connecting passages. The screws are alternately inserted from either side, so that not only is the basic shape of the casing parts identical, but in fact all details thereof are identical.

On its top surface the valve casing carries a ring of holes 41 for locking a handle 40. It can be pivoted about an axis 42 in opposition to the tension of a spring 43 and connects to said handle a connecting part 44 located on connecting profile 30. On the handle is provided a detent 45, which can enter the holes 41.

FIG. 3 shows the valve in a position, where it seals the upper connecting passage 19, while the two lower connecting passages are interconnected. It can be clearly seen that through the curved back surface 33 of the closure portion 31, but which is flatter than a rotary body, the valve only engages with the marginal areas 35 on the sealing faces 27 and also when pivoting the valve body about the axis 20 the back surface need not pass along the sealing faces 27. As shown in FIG. 3, the inner face 46 of the closure portion 31 can be cross-sectionally substantially flat, but can also have a certain curvature. It is clear in this case that the through-flow cross-section of the valve is a flat arc without any significant constriction or extension, so that the flow resistance is extremely small. As a result of a corresponding shape of the valve body adaptation to particular requirements is possible.

As a result of correspondingly curved connecting pieces 47 (FIGS. 12 to 14), the valve can be organically placed in through lines, as well as line bends or branches. The valve spindle is at right angles to the branching surface and can be easily operated. Operation takes place by raising the lever 40, so that the detent 45 is freed from the holes 41, followed by corresponding turning. Apart from the three positions designated, in which the closure portion 31 in each case completely closes one of the passages, many intermediate positions are possible, where a specific flow distribution can be carried out.

FIG. 15 shows that there can be a free flow from all sides round the closure portion 31 of the valve body in an intermediate position, so that the valve can be cleaned by washing without disassembly. This can also be brought about without interrupting operation in a parallel (in this case upper) branch. In the lower part cleaning liquid is supplied from the left and flows on either side round the closure portion 31 acting as a deflecting member, so that also in the connecting tube portion 48 there can be a cleaning flow into and out of the same over and beyond the other side of the valve body. This is a very great advantage in food enterprises, where the cleaning has to be carried out very frequently, usually daily or at even more regular intervals. The valve has no inaccessible corners, which could form bacterial concentration points, as well as no dead spaces, because the valve chamber 21 is formed by a penetration of the valve passages.

FIG. 11 shows that, if necessary, outside the passage holes 26 through the seal 14, it is also possible to have guide bushes 49 for the journals, but this is not generally necessary. As a result of the then somewhat elastic mounting of the valve body, it can be well adapted to the sealing faces 27. As a result of the internal pressure in the valve a certain self-reinforcement of the valve pressure is obtained.

I claim:

1. A valve comprising a valve casing surrounding a valve chamber, at least three connecting channels leading to the valve chamber, sealing means including a sealing seat at an entrance of each connecting channel into the valve chamber, closure means provided in the valve chamber, said closure means being pivotable about a pivot axis to cooperate with said sealing seats for connecting or disconnecting each of said connecting channels to said valve chamber, the closure means having a flap-like closure portion arranged eccentrically with respect to the pivot axis the closure means having two aligned journals for pivoting about said pivot axis, said closure portion connecting the journals and extending with an axially centrally flattened curvature, the closure means having a back surface remote from the pivot axis, the back surface comprising a sealing marginal area cooperating with the sealing means which form a portion of an imaginary peripheral body of revolution about said pivot axis of the closure means, the back surface having an intermediate surface area surrounded by the marginal area, said intermediate surface area being curved away from the pivot and proximate the imaginary peripheral body with a flatter curvature then said imaginary peripheral body, whereby the closure means can be set in an intermediate position, in which all at least three sealing seats and the whole surface of the closure portion are freely accessible by a cleaning liquid flowing through the valve chamber.

2. Valve according to claim 1, wherein the closure means has two aligned journals and a closure portion connecting the same and which extends with a centrally flattened curvature on one side from the axis interrupted in the closure portion area between the journals.

3. Valve according to claim 1, wherein the closure means is shaped in such a way that the marginal area cooperates with two adjacent webs of the sealing means which are reciprocally displaced by an angle of less than 180°.

4. Valve according to claim 1, wherein the closure means in a position interconnecting two connecting channels interconnects wall portions of the channels for forming a curved through passage with a substantially identical flow cross-section to the channels.

5. Valve according to claim 1, wherein the closure means can be brought into a cleaning position, in which two sides of a closure portion and a sealing marginal area thereof are located in the valve chamber so that a through flow can pass round the same.

6. Valve according to claim 1, wherein the closure portion projects as a deflecting surface into flow in the valve.

* * * * *